United States Patent
Bettelheim et al.

(10) Patent No.: US 7,534,524 B2
(45) Date of Patent: May 19, 2009

(54) METHANOL FUEL CELLS

(75) Inventors: Armand Bettelheim, Beer-Sheva (IL); Eliyaho Korin, Beer-Sheva (IL)

(73) Assignee: Ben-Gurion University of the Negev, Beer-Sheva (IL)

( * ) Notice: Subject to any disclaimer, the term of this patent is extended or adjusted under 35 U.S.C. 154(b) by 451 days.

(21) Appl. No.: 10/476,510

(22) PCT Filed: May 2, 2002

(86) PCT No.: PCT/IL02/00343

§ 371 (c)(1),
(2), (4) Date: Apr. 13, 2004

(87) PCT Pub. No.: WO02/091502

PCT Pub. Date: Nov. 14, 2002

(65) Prior Publication Data
US 2004/0185324 A1    Sep. 23, 2004

(30) Foreign Application Priority Data
May 3, 2001    (IL)    ................................ 142951

(51) Int. Cl.
*H01M 4/00*    (2006.01)
(52) U.S. Cl. ..................... 429/128; 429/12; 429/40; 429/209
(58) Field of Classification Search ............. 429/128, 429/12, 40, 209
See application file for complete search history.

(56) References Cited

U.S. PATENT DOCUMENTS

| | | | | |
|---|---|---|---|---|
| 3,553,022 A | * | 1/1971 | Gregory | ...................... 429/42 |
| 4,940,640 A | * | 7/1990 | MacDiarmid | ............... 429/213 |
| 5,683,829 A | | 11/1997 | Sarangapani | .................. 429/42 |
| 5,840,443 A | | 11/1998 | Gregg et al. | ................. 429/212 |
| 5,874,182 A | | 2/1999 | Wilkinson et al. | ............ 429/30 |
| 2003/0113611 A1 | * | 6/2003 | Abe et al. | ..................... 429/43 |

FOREIGN PATENT DOCUMENTS

| | | |
|---|---|---|
| EP | 0 376 689 A2 | 7/1990 |
| GB | 2019239 | 10/1979 |
| JP | 57065332 * | 4/1982 |
| JP | 11-162468 A | 6/1999 |
| JP | 11162468 | 6/1999 |

OTHER PUBLICATIONS

F. Bedioui, J. Devynck and C. Bied-Charreton, Acc. Chem Res., 28 (1995), 30-36.

(Continued)

*Primary Examiner*—Jane Rhee
(74) *Attorney, Agent, or Firm*—Marsteller & Associates, P.C.

(57) ABSTRACT

A cathode for a liquid fuel cell, which is covered with a film that is a liquid fuel barrier, but is permeable to oxygen, or for a direct methanol fuel cell, which is covered with a film that is a methanol barrier, but is permeable to oxygen. The fuel barrier may be made of the polymer of a macrocyclic compound having, in the same molecule, preferably three substituents that allow polymerization and crosslinking. The methanol barrier may be made of a polymerized porphyrin, wherein the porphyrin is chosen from among non-metallated and metallated porphyrins.

2 Claims, 9 Drawing Sheets

OTHER PUBLICATIONS

H. Uchida, Y. Mizuno and M. Watanabe, J. Electrochem. Soc., 149 (2002),A682-A687.

Sun, G.Q. et. al: "Iron (III) tetramethoxyphenylporphyrin (FETMMP) as methanol . . . cells", Journal of Applied Electrochemistry, vol. 28, No. 10, Oct. 1, 1998, pp. 1087-1093; XP000.

Surampudi et al, Journal of Power Sources, vol. 47, 377-385 (1994).

Pu et a., Journal of the Electrochemical Society, vol. 142, L119-120 (1995).

Bettelheim et. al, Electrochemical Polymerization of Amino, Pyrrole, and Hydroxy substituted Tetraphenylporphyrins, Inorg. Chem. 26, 1009-1017.

Bettelheim et. al, Electrocatalysis of Dioxygen Reduction in Aqueous Acid . . . , J. Electroanal. Chem., 217 (1987) 271-286.

Bard et al., Electrochemical Methods, Fundamentals and Applications, John Wiley, 1980.

* cited by examiner

| X | abbreviation |
|---|---|
|  | $H_2$(o-$NH_2$)TPP |
|  | $H_2$(m-$NH_2$)TPP |
|  | $H_2$(p-$NH_2$)TPP |
|  | $H_2$(p-$NMe_2$)TPP |
|  | $H_2$(p-OH)TPP |
|  | $H_2$(p-pyr)TPP |

METHANOL FUEL CELLS

FIELD OF THE INVENTION

This invention relates to direct methanol fuel cells (hereinafter, briefly, DMFC) which are low temperature, solid polymer electrolyte, fuel cells directly fed by liquid methanol. More specifically, this invention relates to cells in which the methanol diffusion from the anode to the cathode side across the polymer electrolyte membrane is prevented or greatly reduced, thereby increasing the oxygen reduction current in the cell. This invention also relates to electrodes provided with a coating that constitutes a methanol barrier and to methods for preparing such electrodes.

BACKGROUND OF THE INVENTION

Electrochemical fuel cells convert fuel and oxidant to electricity and reaction product. Fluid reactants are supplied to a pair of electrodes, which are in contact with and separated by an electrolyte. The electrolyte may be a solid or a liquid. In the solid polymer electrochemical fuel cells the electrodes typically comprise an electrode substrate and an electrocatalyst layer disposed upon one major surface of the electrode substrate. The electrode substrate typically comprises a sheet of porous, electrically conductive material, such as carbon fiber paper or carbon cloth. The layer of electrocatalyst is typically in the form of finely comminuted metal, typically platinum, and is disposed on the surface of the electrode substrate at the interface with the membrane electrolyte in order to induce the desired electrochemical reaction. In a single cell, the electrodes are electrically coupled to provide a path for conducting electrons between the electrodes through an external load.

At the anode, the fuel moves through the porous anode substrate and is oxidized at the anode electrocatalyst layer. At the cathode, the oxidant moves through the porous cathode substrate and is reduced at the cathode electrocatalyst layer.

The catalyzed reaction at the anode produces hydrogen cations (protons) from the fuel supply. The ion-exchange membrane facilitates the migration of protons from the anode to the cathode. In addition to conducting protons, the membrane isolates the hydrogen-containing gaseous fuel stream from the oxygen-containing gaseous oxidant stream. At the cathode electrocatalyst layer, oxygen reacts with the protons that have crossed the membrane to form water as the reaction product.

In liquid feed, electrochemical fuel cells, one or more of the reactants is introduced to the electrocatalyst in liquid form. Most commonly, methanol is the fuel supplied to the anode (so-called "direct methanol" fuel cells) and oxygen to the cathode. In fuel cells of this type, the reaction at the anode produces protons, which arise from the oxidation of methanol. An electrocatalyst promotes the methanol oxidation at the anode. The protons formed at the anode electrocatalyst migrate through the electrolyte from the anode to the cathode, and at the cathode electrocatalyst layer the oxidant reacts with the protons to form water.

In electrochemical fuel cells employing liquid or solid electrolytes and gaseous or liquid reactant streams, crossover of a reactant from one electrode to the other is generally undesirable. Reactant crossover may occur if the electrolyte is permeable to the reactant, that is, some of a reactant introduced at a first electrode of the fuel cell may pass through the electrolyte to the second electrode, instead of reacting at the first electrode. Reactant crossover typically causes a decrease in both reactant utilization efficiency and fuel cell performance. Fuel cell performance is defined as the voltage output from the cell at a given current density or vice versa; the higher the voltage at a given current density or the higher the current density at a given voltage, the better the performance.

In solid polymer, electrochemical fuel cells, the ion-exchange membrane may be permeable to one or more of the reactants. For example, ion-exchange membranes typically employed in solid polymer electrochemical fuel cells are permeable to methanol; thus, methanol which contacts the membrane prior to participating in the oxidation reaction can cross over to the cathode side. Diffusion of methanol fuel from the anode to the cathode leads to a reduction in fuel utilization efficiency and to performance losses (see, for example, S. Surampudi et al., Journal of Power Sources, Vol. 47, 377-385 (1994) and C. Pu et al., Journal of the Electrochemical Society, Vol. 142, L119-120 (1995)).

Fuel utilization efficiency losses arise from methanol diffusion away from the anode because some of the methanol which would otherwise participate in the oxidation reaction at the anode and supply electrons to do work through the external circuit is lost. Methanol arriving at the cathode may be lost through vaporization into the oxidant stream, or may be oxidized at the cathode electrocatalyst, consuming oxidant.

Methanol diffusion to the cathode may lead to a decrease in fuel cell performance. The oxidation of methanol at the cathode reduces the concentration of oxygen at the electrocatalyst and may affect access of the oxidant to the electrocatalyst. Further, depending upon the nature of the cathode electrocatalyst and the oxidant supply, the electrocatalyst may be poisoned by methanol oxidation products, or sintered by the methanol oxidation reaction. Diffusion of methanol across the $H^+$-conducting porous polymer electrolyte membrane is one of the fundamental problems of the DMFC. To overcome it, it has been proposed to use barrier layers of electrolyte in the electrolyte membranes, particularly palladium layers.

It has also been proposed to provide improved polymer electrolyte membranes for DMFCs, utilizing cross-linked polystyrene sulfonic acid within electrochemically inert matrices of poly(vinylidene fluoride) or using other matrix membranes in place of polyvinylene fluoride or blended or co-polymerized with it.

U.S. Pat. No. 5,874,182 proposes a liquid feed electrochemical fuel cell comprising: a) a first electrode comprising a quantity of catalysts and a self-supporting porous sheet material having first and second appositely facing measured surfaces, said first electrode fluidly connected to a source of liquid reactant;

b) a second electrode;

c) an ion-exchange membrane interposed between said electrodes; wherein said catalyst is distributed through the thickness of said sheet material between said measured surfaces.

However, the solutions of the prior art are not fully satisfactory. Palladium is an expensive material and its use as a barrier layer involves lack of stability due to adhesion and oxidation problems. The membranes proposed in the prior art have lack of uniformity and decreased proton conductivity. At any rate, all the proposed modifications of the fuel cells do not result in significant reduction of methanol crossover, and the problem of methanol crossover is still significantly felt.

A general structure of fuel cells with which this invention is concerned is schematically indicated in FIG. 1. It comprises a cathode 10 and an anode 11 separated by a polymer electrolyte 12. Liquid fuel, in this case methanol, is supplied from a tank 13 to the anode and oxygen (or air) is supplied by a compressor 14 to the cathode. $CO_2$ is discharged from tank 13, as indicated at 15. The polymer electrolyte is permeable to the methanol, which therefore can migrate through the polymer electrolyte to the cathode.

It is therefore a purpose of this invention to prevent methanol, and in general, liquid fuel, from coming into contact with the cathode, thereby poisoning the same.

It is another purpose of this invention to prevent the crossover of methanol without changing the polymer electrolyte.

It is a further purpose of this invention to provide a cathode provided with a methanol barrier that protects said cathode from being poisoned by the methanol.

It is a still further purpose of the invention to provide such an electrode whether its the surface is smooth or not.

It is a still further purpose to provide an improvement in fuel cell electrodes that is efficient even in $H_2/O_2$ fuel cells wherein the fuel is not methanol.

It is a still further purpose of the invention to permit to dispense, in certain cases, from the presence of the solid electrolyte.

It is a still further purpose of the invention to provide a process for producing said improved electrodes.

It is a still further purpose of the invention to achieve the aforesaid purposes without significantly hindering the oxygen reduction process if the cathode is an oxygen cathode.

It is a still further purpose of the invention to provide a process whereby commercially available catalytic electrodes, which can be used as oxygen cathodes in fuel cells, are improved to achieve the purposes of the invention.

Other purposes and advantages of the invention will appear as the description proceeds.

SUMMARY OF THE INVENTION

According to the invention, in a fuel cell, particularly but not exclusively a direct methanol fuel cell (DMFC), the cathode is covered with a film that is a liquid fuel barrier, particularly a methanol barrier, but is permeable to oxygen. Hereinafter, reference will be made only to methanol, for descriptive purpose, but this should not be construed as a limitation, since the invention can be applied, mutatis mutandis, to cells in which the fuel is different from methanol.

In a preferred form of the invention, the methanol barrier is made of a polymerized porphyrin. Preferably, the porphyrin should include groups that allow the polymerization of the porphyrin; and more preferably, at least three such groups, not necessarily identical, should be present in the same porphyrin molecule. Compounds that are not porphyrins also come within the scope of the invention, provided that they are macrocyclic compounds preferably containing, in the same molecule, three substituents that allow polymerization and crosslinking. Such compounds yield cross-linked polymers, which are preferred according to the invention.

As has been said, the invention includes fuel cells in which the fuel is not methanol. The fuel could consist of other alcohols, and in general, of any compound the molecule of which can be oxidized at the anode and is large at least as that of methanol.

In a particular embodiment of the invention, the cathode surface is smooth and the barrier film is applied directly onto it. In another embodiment of the invention, the cathode surface is not smooth, e.g., it is relatively coarse as in commercially available catalytic electrodes, and an intermediate layer is provided on the surface of the cathode to smoothen the said surface, whereby the fuel barrier film can be applied, as a second or outer layer, over said intermediate layer and will serve as a methanol barrier.

The invention also provides a process for generating over the electrode a coating, which constitutes a fuel barrier, particularly a methanol barrier, by electrochemical polymerization, viz. by applying to the solution of porphyrin in a solvent a potential lower than that at which the solvent significantly decomposes through oxidation at the electrode surface. While maintaining said upper limit, the potential can be applied as a constant potential close to said decomposition potential or lower, or can be cyclically changed or stepped, particularly from zero to close to said decomposition potential. The solvent can be an acidic aqueous solution, such as e.g. a solution of $H_2SO_4$ or $HClO_4$, or a basic aqueous solution, such as a solution of NaOH or KOH, and in that case the maximum potential can preferably be in the range +1 to +1.2 volts (vs. SCE). The solvent can also be organic, such as e.g. acetonitrile or methylene chloride, and in this case the maximum potential can be higher.

According to the invention, the porphyrin or other compound as hereinbefore defined is originally present as a monomer in the solution. The polymerization occurs in the cell. Information as to the polymerization of porphyrins can be found in A. Bettelheim et al., Electrochemical Polymerization of Amino-, Pyrrole-, and Hydroxy-substituted Tetraphenylporphyrins, Inorg. Chem., 26, 1009-1017, and in A. Bettelheim et al., Electrocatalysis of Dioxygen Reduction in Aqueous Acid and Base by Multimolecular Layer Films of Electropolymerized Cobalt Tetra(o-aninophenyl)porphyrin, J. Electroanal. Chem., 217 (1987) 271-286. A preferred way of carrying out the polymerization consists in applying a constant potential and maintaining it until the current decreases to a constant and low current. In this way dense films of polymerized, and preferably cross-linked, porphyrins are obtained.

If the electrode has a coarse surface, an intermediate layer is applied, as stated above, and it should be thick enough to smoothen said surface and be of a polymer which is also a good proton conductor. Said polymer should have the properties of electric charge conductivity and proton conductivity. Electric charge conductivity is provided by polymers such as e.g. polyaniline, polypyrrole and polythiophene. The sulfonic group is one of the best proton conductive groups. Therefore the said polymers should be preferably chemically bound or doped with the sulfonic group, or another proton conductive group, by binding the group to the corresponding monomer (e.g., aniline, pyrrole or thiophene) or introducing a compound which contains the group as the counter ion during the electropolymerization of the monomer.

In another aspect thereof, the invention comprises the use of polymerized porphyrins for forming methanol barriers in direct methanol fuel cell,

DETAILED DESCRIPTION OF PREFERRED EMBODIMENTS

Figure 2:
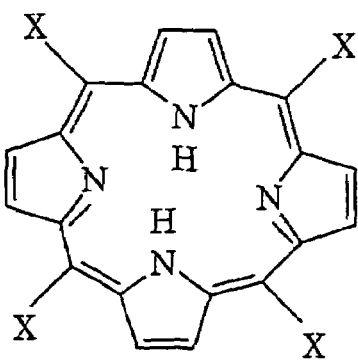
FIG. 2 illustrates the chemical formula of some porphyrins.
Figure 2:
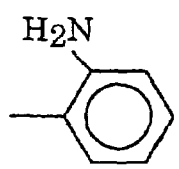
Figure 2:
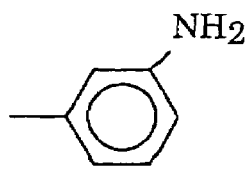
Figure 2:
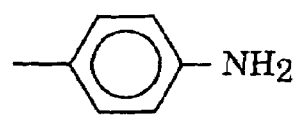
Figure 2:
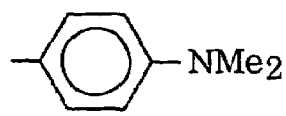
Figure 2:
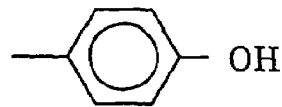
Figure 2:
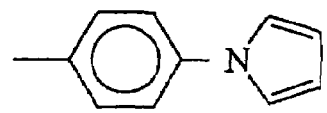

As stated hereinbefore, the preferred chemicals for making the methanol barrier on the cathode are porphyrins, particularly chosen from among amino-, hydroxy-, pyrrole- and vinyl-substituted porphyrins. The porphyrins may contain metals in the substituting groups. Metal ion may be contained in the central porphyrin location, as occurs in certain natural substances such as heme. The general formula of the said porphyrin, in which X indicates a wide range of substituents, is shown in FIG. 2. Some substituents X, that form different porphyrins adapted for use in this invention, are indicated on FIG. 2, which also indicates the abbreviations used to define the various porphyrins defined by said substituents. By way of example, said porphyrins may be chosen from among tetrakis (ortho-aminophenyl)porphyrin,
tetrakis(metha-aminophenyl)porphyrin,
tetrakis(para-aminophenyl)porphyrin,
tetrakis(para-dimethylaminophenyl)porphyrin,
tetrakis(para-hydroxophenyl)porphyrin, and
tetrakis(para-pyrrolephenyl)porphyrin.

FIG. 2 and the foregoing list, however, are illustrative but not limitative: other porphyrins can be used in this invention, such as vinyl substituted porphyrins, e.g. protoporphyrin IX.

Figure 9:
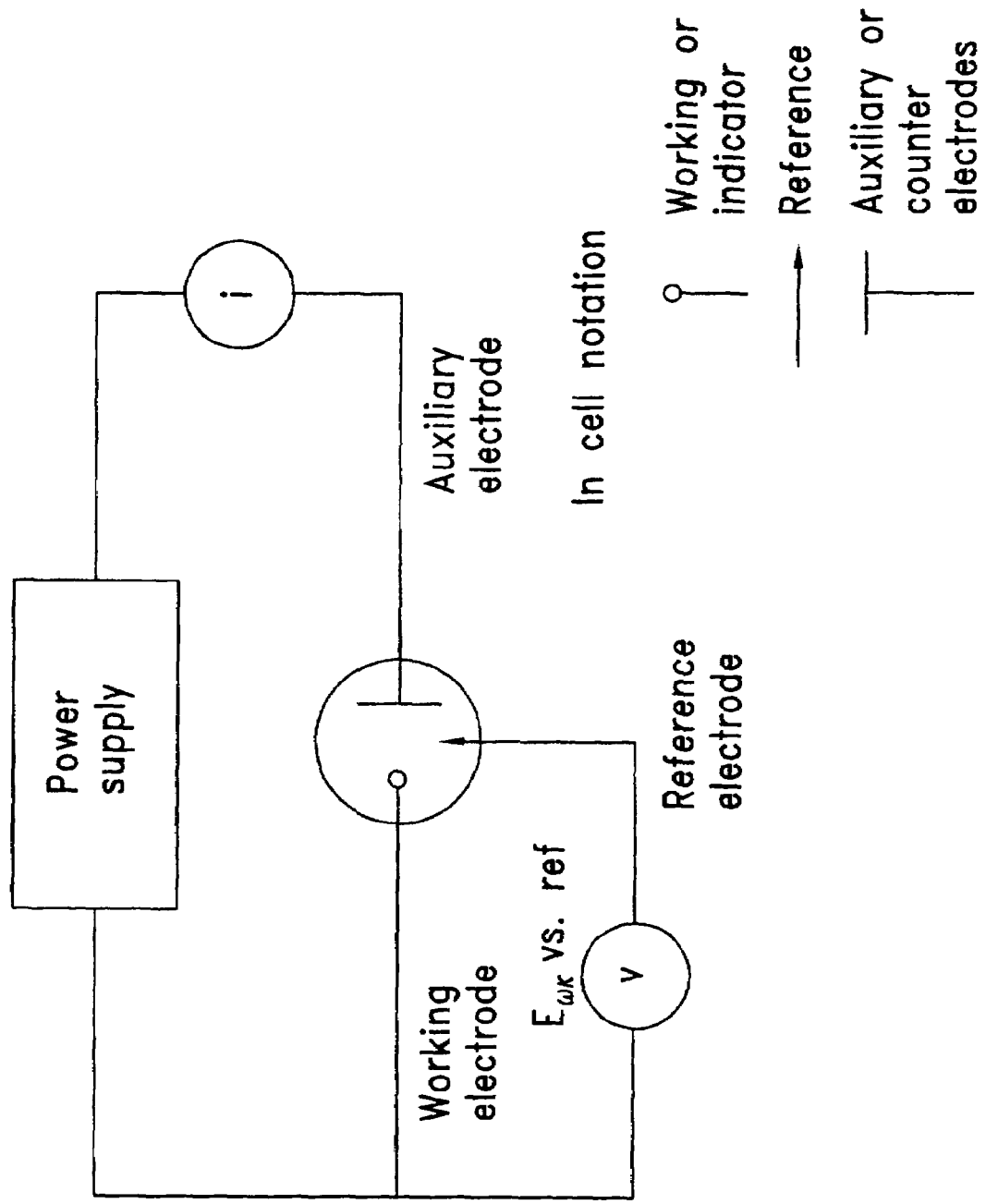
FIG. 9 is a scheme of the three-electrode cell.

In most of the following examples, three-electrode cells are considered. The three-electrode cells comprise a working electrode, a counter electrode and a reference electrode. A scheme of the three-electrode cell is shown in FIG. 9, which is self-explanatory (see A. J. Bard and L. R. Faulkner, "Electrochemical Methods, Fundamentals and Applications", John Wiley, 1980).

EXAMPLE 1

Experimental set-up: The experiment was conducted in a conventional three-electrode cell (half-cell configuration). One of two glassy carbon electrodes cast in Teflon and supplied by Metrohm(Switzerland) (A=0.07 $cm^2$) (abbreviated: A and B) served as working electrode, a Pt wire in a separate compartment served as counter electrode and a saturated calomel electrode (SCE) as reference electrode. Potential was applied between the working and reference electrodes using a 273 potentiostat (EG&G).

Treatment and coating of working electrodes: Electrodes A and B were first polished with a water emulsion of 0.3μ alumina and then coated with Pt (as an oxygen reduction catalyst) by applying a current of 5 mA/$cm^2$ for 10 minutes from an $10^{-2}$ M $H_2PtCl_6$+1 M $H_2SO_4$ solution at room temperature. Electrode A was then coated with an electropolymerized film of (o-$NH_2$)TPP (abbreviated: poly(o-$NH_2$)TPP) by cycling the potential 20 cycles from 0 to +1.2 V at a scan rate of 50 mV/s from a solution of $H_2$(o-$NH_2$)TPP dissolved in 1 M $H_2SO_4$ (1 mg/ml) at room temperature. Electrode B was not coated with this film.

Figure 3:
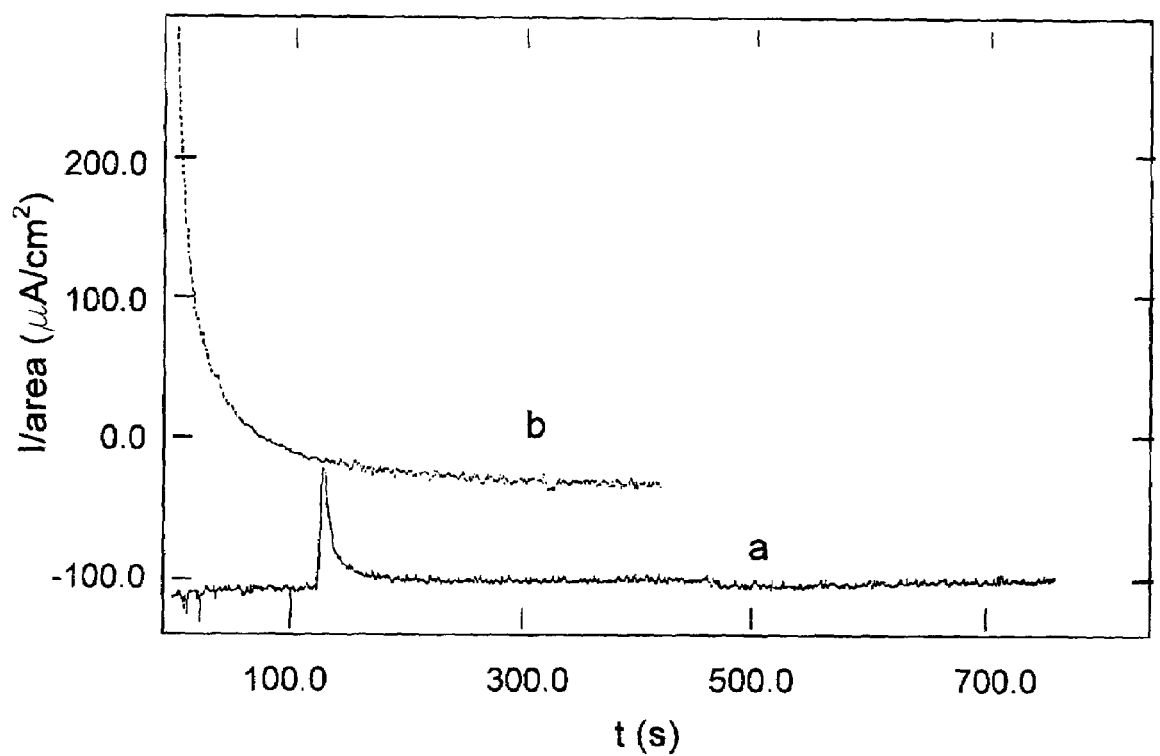
FIG. 3 shows chronoamperometric curves obtained for oxygen reduction relating to an embodiment of the invention.

Results: FIG. 3 shows chronoamperometric curves obtained for oxygen reduction at room temperature at a potential of +0.2 V in a solution of 1M $H_2SO_4$+1M methanol continuously bubbled with air (100 cc/min): curves (a) and (b) for electrodes A and B, as working electrode, respectively. It can be seen from the figure that when the electrode is coated with the methanol barrier film (as in electrode A), the steady oxygen reduction current at +0.2 V and in the presence of 1M methanol is −105 μA/$cm^2$. However, in the absence of this film (as in electrode B), the steady oxygen reduction current is only −0.33 μA/$cm^2$. This means that the methanol barrier film causes less methanol to reach the electrode and thus less catalytic platinum catalytic sites are poisoned by methanol and are therefore available for oxygen reduction.

EXAMPLE 2

Experimental set-up: The same experimental set-up (half-cell configuration) as described in Example 1 was used.

Treatment and coating of working electrodes: The glassy carbon electrodes A and B were polished and then coated with Pt as in Example 1. Electrode A was then coated with poly (o-$NH_2$)TPP by stepping the potential 30 times from 0 (10 s) to +1.2 V (60 s) from a solution of $H_2$(o-$NH_2$)TPP dissolved in 1M $H_2SO_4$ (1 mg/ml) at 60° C. Electrode B was not coated with this film.

Figure 4A:
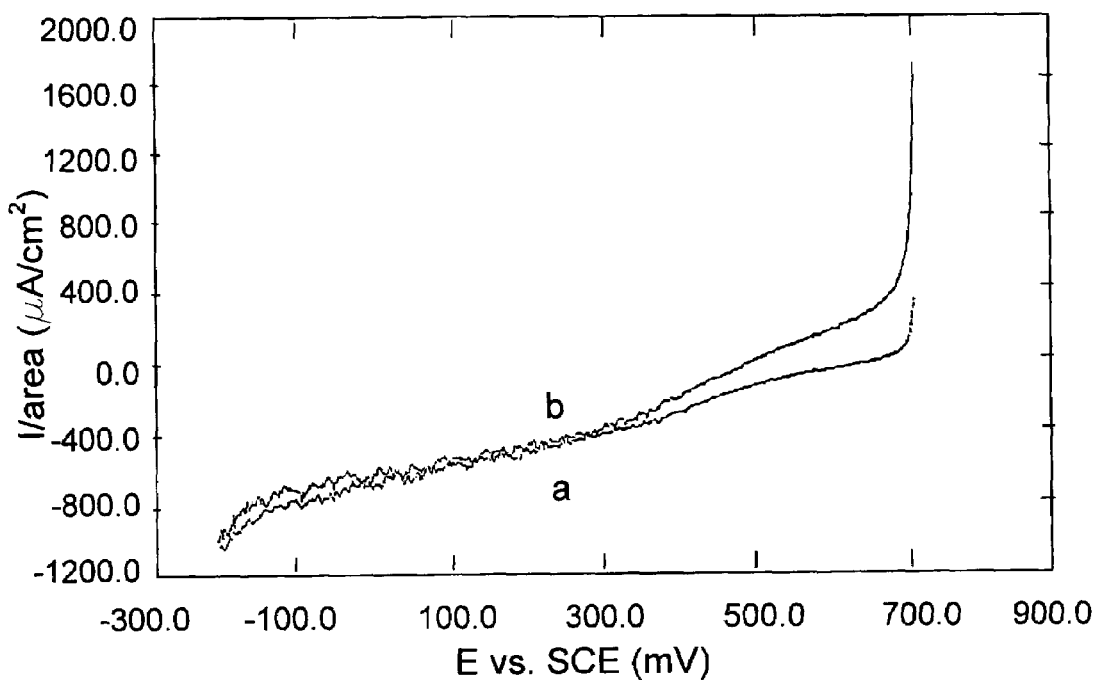
FIGS. 4A and B show oxygen reduction polarization curves relating to another embodiment of the invention.

Results: FIG. 4A shows oxygen reduction polarization curves (at a scan rate of 5 mV/s) obtained in 1M $H_2SO_4$ solution at 70° C. continuously bubbled with air (100 cc/min) for electrode A in the absence (curve a) and presence of 0.5 M methanol (curve b).

Figure 4B:
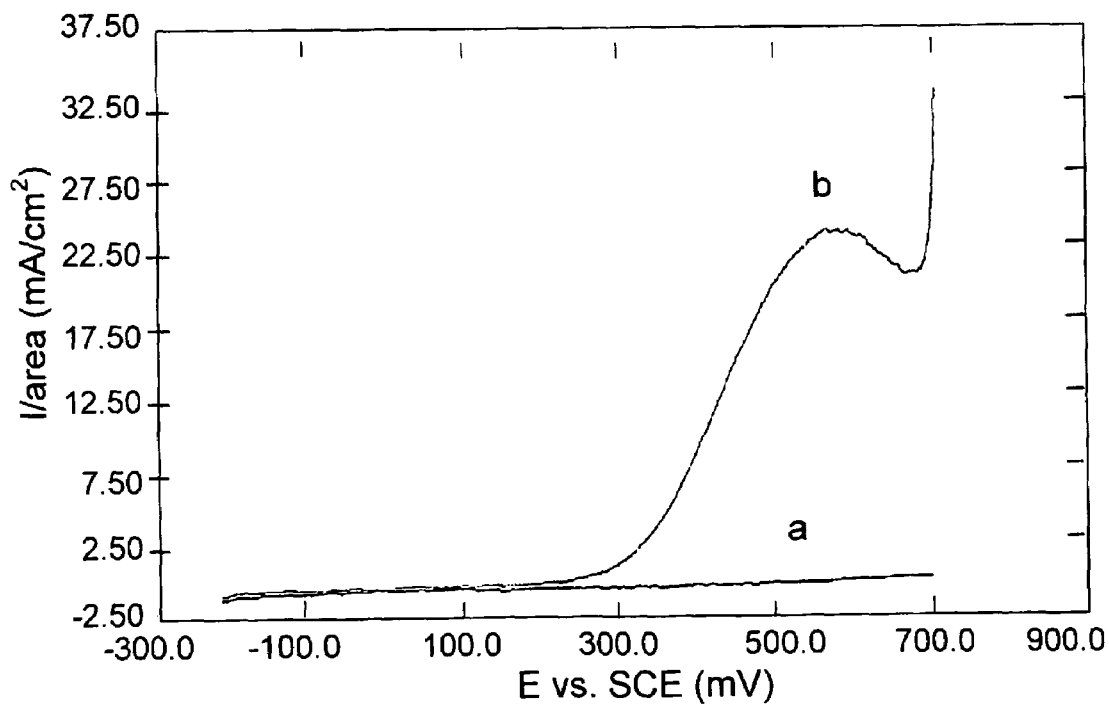

FIG. 4B shows oxygen reduction polarization curves (5 mV/s) obtained in the same solution and conditions as in FIG. 3 for electrode B in the absence (curve a) and presence of 0.5 M methanol (curve b).

Table I summarizes the currents obtained at two potentials (vs. SCE) for electrodes A and B.

TABLE I

Oxygen reduction currents obtained from polarization curves (FIGS. 4A and 4B) in 1M $H_2SO_4$ at 70° C. for electrodes A and B (Example 2).

| Electrode | Current density* (mA/$cm^2$) at +0.1 V | Current density* (mA/$cm^2$) at +0.5 V |
|---|---|---|
| Electrode A, absence of methanol. | −0.58 | −0.14 |
| Electrode A, presence of 0.5 M methanol. | −0.56 | +0.01 |
| Electrode B, absence of methanol. | −0.42 | −0.31 |
| Electrode B, presence of 0.5 M methanol. | −0.23 | +19.7 |

*Negative and positive currents are for cathodic and anodic currents, respectively.

It can be seen from FIGS. 4A and 4B and from Table I that while only 55% of the current for oxygen reduction at +0.1 V remains after the addition of methanol for electrode B, which is uncoated with a methanol barrier film, 96% of the current remains at the same conditions for the electrode coated with the methanol barrier film (electrode A). The fact that almost no methanol crosses the barrier film can also be concluded from the very low oxidation current observed after the addition of methanol at +0.5 V (originating from methanol oxidation) for the electrode coated with the barrier film, compared to the very high current observed for the non-coated electrode (0.01 and 19.7 mA/$cm^2$, for electrodes A and B, respectively).

EXAMPLE 3

Figure 1:
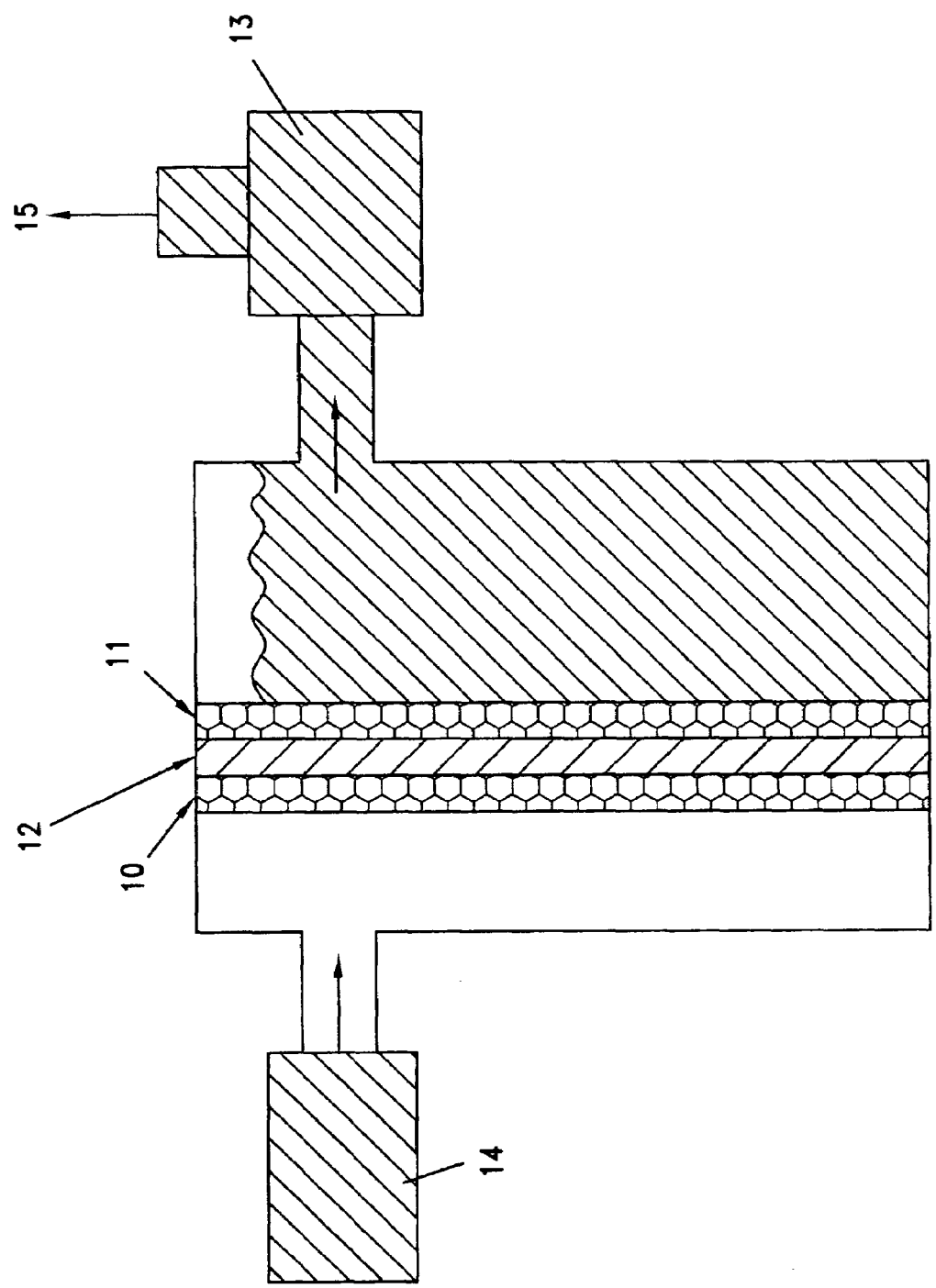
FIG. 1 is a schematic illustration of the typical two-electrode, liquid fuel cell.

Experiments with commercially available cathodes and anodes for fuel cells were conducted first in a three-electrode (half cell) and then with a two-electrode (full cell) configuration set-up. Example 3 describes an experiment conducted with a commercially available cathode. In the two-electrode experiment, the cell used was not as illustrated in FIG. 1: a solution of acid was used as the electrolyte instead of a solid polymer membrane, and the same setup was used as for the three-electrode experiment setup, but the counter and reference electrodes were short-circuited.

Half-cell experimental set-up: The three-electrode set-up was similar to that of experiments 1 and 2. However, the working electrode used in this experiment was a commercially available electrode supplied by E-TEK: EFCG "S" Type Electrode on TGFH-120 Toray Carbon Paper, 10% Pt/C, 0.5 mg/cm² Pt loading. Part of the electrode was brushed with masking paint so that only 1 cm² was exposed to the electrolytic solution.

Figure 5:
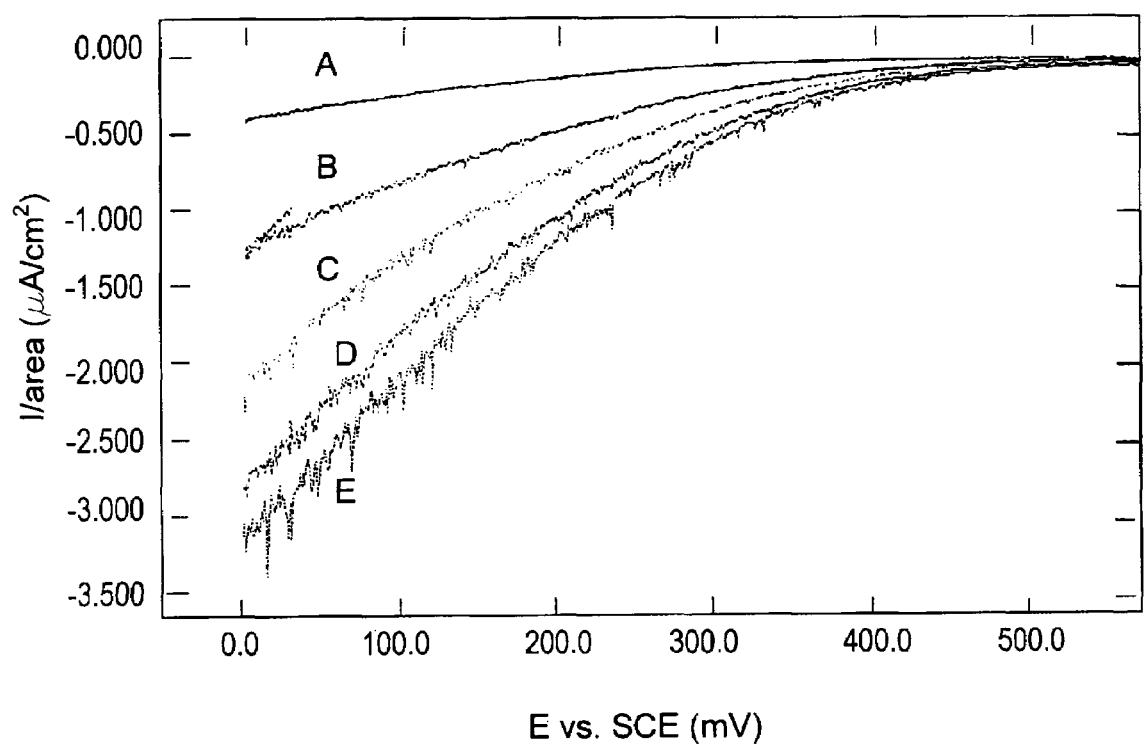
FIGS. 5 to 7 show other polarization curves obtained under conditions and for embodiments described hereinafter.

Treatment and coating of working electrode: The reactivity of the above electrode towards the cathodic reduction of oxygen in a 1M $H_2SO_4$ solution at 60° C. and continuously bubbled with air is low. This can be deduced by the polarization curve A (obtained at a scan rate of 1 mV/s) in FIG. 5. However, we found that after applying a potential of +1.1 V (between this electrode and the reference electrode SCE) in the same solution and temperature as indicated above, the polarization curves obtained for oxygen reductions show higher currents. This is shown in FIG. 5 for different times of treatment at +1.1 V (curves B, C, D and E are for ⅓, 1, 2 and 3 hours treatment, respectively). After a three-hour treatment, the oxygen reduction current at +0.15 V increased from 0.18 to 1.6 mA/cm₂, i.e., an 8.9-fold increase. We attribute this effect as resulting from the evolvement of oxygen due to electrochemical oxidation of water at +1.1 V. The gas evolved in narrow pores contained in the electrode structure probably causes the increase of the catalytic effective area, a process that we call: "electrochemical digging".

Figure 6:
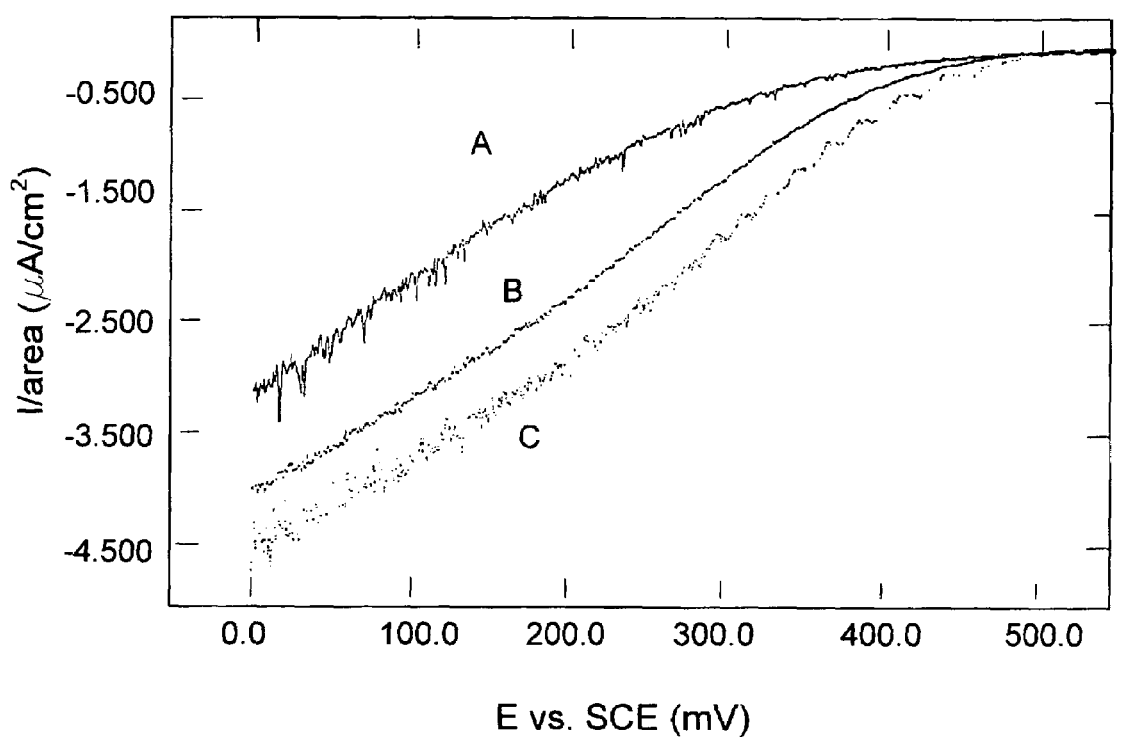

The second treatment step was to coat with a thick polymeric film which smoothens the surface morphology. The polymer which we found that is suitable for this purpose is poly(aniline sulfonic acid). This polymer also is a good proton conductor (due to the presence of the sulfonic groups), a necessary property of electrodes in fuel cells. Coating of the electrode with this polymer was conducted electrochemically (electropolymerization) by cycling the potential applied on the electrode between 0 and +0.8 V (scan rate of 50 mV/s, 60 cycles) in a solution containing 1M $H_2SO_4$ and $5 \times 10^{-2}$ M monomeric aniline sulfonic acid at a temperature of 60° C. FIG. 6 shows the polarization oxygen reduction curve obtained (same solution and temperature as in FIG. 5) after this coating procedure, compared to that obtained after the "electrochemical digging" procedure (curves B and A, respectively). Further coating of poly(aniline sulfonic acid) on the same electrode was achieved by applying a constant potential of +0.8 V for 30 minutes in the $H_2SO_4$+aniline sulfonic acid solution (60° C.). Curve C represents the polarization reduction curve for oxygen after this step. From FIG. 6, it can be deduced that the polymeric coating does not perturb oxygen diffusion to the catalytic layer. Moreover, this coating even increases the electrode reactivity towards oxygen reduction, probably due to the introduction of proton conductive sulfonic acid groups into the catalytic layer. Continuation of the coating process, however, causes decrease of the oxygen reduction current (probably due to decrease of oxygen permeability onto very thick polymeric films).

The last treatment step was to coat a layer of poly(o-$NH_2$)TPP on top of the poly(aniline sulfonic acid) layer by applying a constant potential of +1.05 V from a solution of $H_2$(o-$NH_2$)TPP dissolved in 1M $H_2SO_4$ (1 mg/ml) at 60° C. Polarization curves were recorded as after the previous treatments and the currents obtained at +0.05 V before and after the addition of 1% methanol in solution are summarized in Table II for increasing times of $H_2$(o-$NH_2$)TPP electropolymerization.

TABLE II

Oxygen reduction currents obtained in the absence and presence of 1% methanol in 1 M $H_2SO_4$ at 60° C. after increasing $H_2$(o-$NH_2$)TPP electropolymerization time.

| Electropolymerization time (hours) for $H_2$(o-$NH_2$)TPP | Current density (mA/cm²) at +0.05 V without methanol | Current density (mA/cm²) at +0.05 V with 1% methanol | Ratio of currents after and before adding methanol (%) |
|---|---|---|---|
| 2 | 3.95 | 3.29 | 83 |
| 5 | 4.38 | 3.93 | 89.7 |
| 9 | 3.46 | 3.13 | 90.5 |

From Table II, it can be deduced that increasing the electropolymerization time from 2 to 5 hours increases the oxygen reduction current obtained in the absence of methanol. Moreover, less decrease of the current is observed after addition of methanol which indicates that less methanol crosses the coating when increasing the electropolymerization time from 2 to 5 hours. A further increase from 5 to 9 hours causes decrease of the current in the absence of methanol with only a small contribution to the ratio of currents after and before the methanol addition (currents ratio increase from 89.7 to 90.5%).

Figure 7:
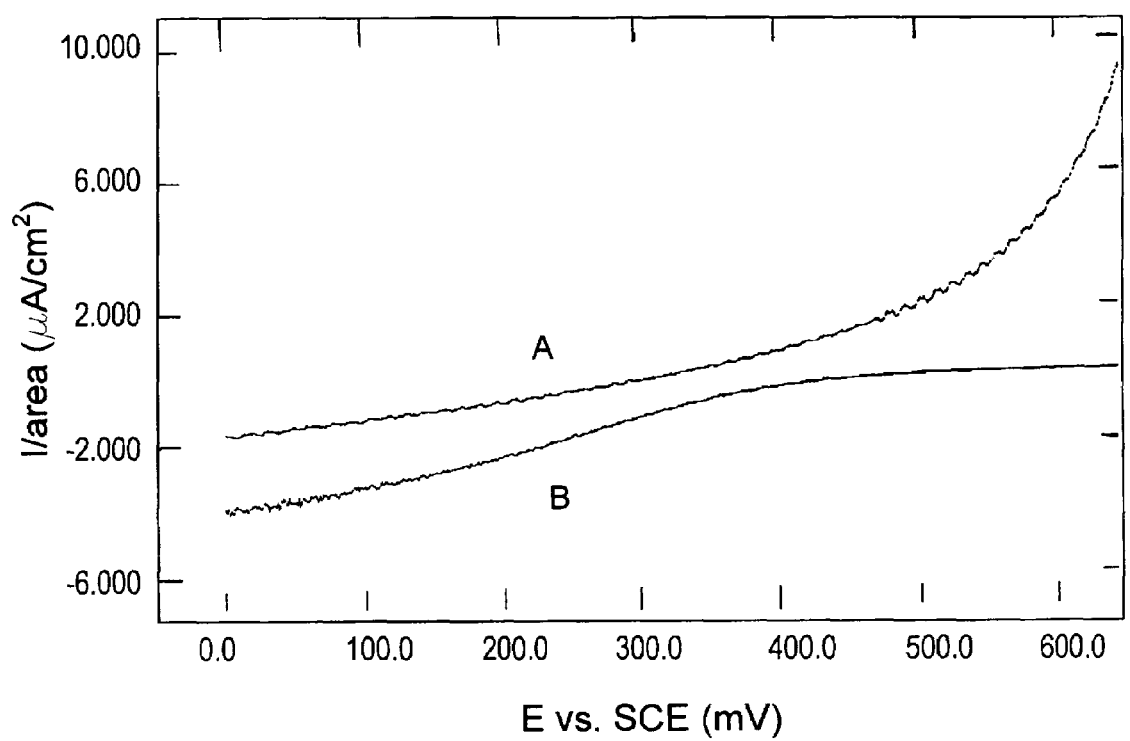

The performance of the electrode with its special treatment and coating that we have developed towards oxygen reduction in the presence of methanol was compared to that of a similar electrode which has been treated by "electrochemical digging", but which has not been coated with poly(aniline sulfonic acid) and poly(o-$NH_2$)TPP. Instead, this electrode was treated with a conventional Nafion coating (dipping for a half hour in a 5% Nafion solution). FIG. 7 shows the oxygen reduction polarization curves obtained in 1 M $H_2SO_4$+2% methanol at 60° C. (air flow rate: 100 cc/min) for the Nafion treated electrode (curve A), compared to the electrode coated with poly(aniline sulfonic acid) and poly(o-$NH_2$)TPP (curve B). It can be clearly seen from this figure that methanol poisons the Nafion coated electrode much more than the electrode with the coating that we developed. This can be deduced by the high anodic currents observed at high positive potentials for the Nafion coated electrode (+2 mA/cm² at +0.5 V, compared to −0.03 mA/cm² at the same potential for the other electrode) as well by the higher cathodic currents for oxygen reduction obtained for the electrode with the coating that we developed (−3.7 mA/cm² at +0.05 V, compared to −1.4 mA/cm² at the same potential for the Nafion coated electrode).

EXAMPLE 4

Example 4 describes an experiment conducted with a commercially available cathode and anode in a two-electrode (full-cell) configuration.

Figure 8:
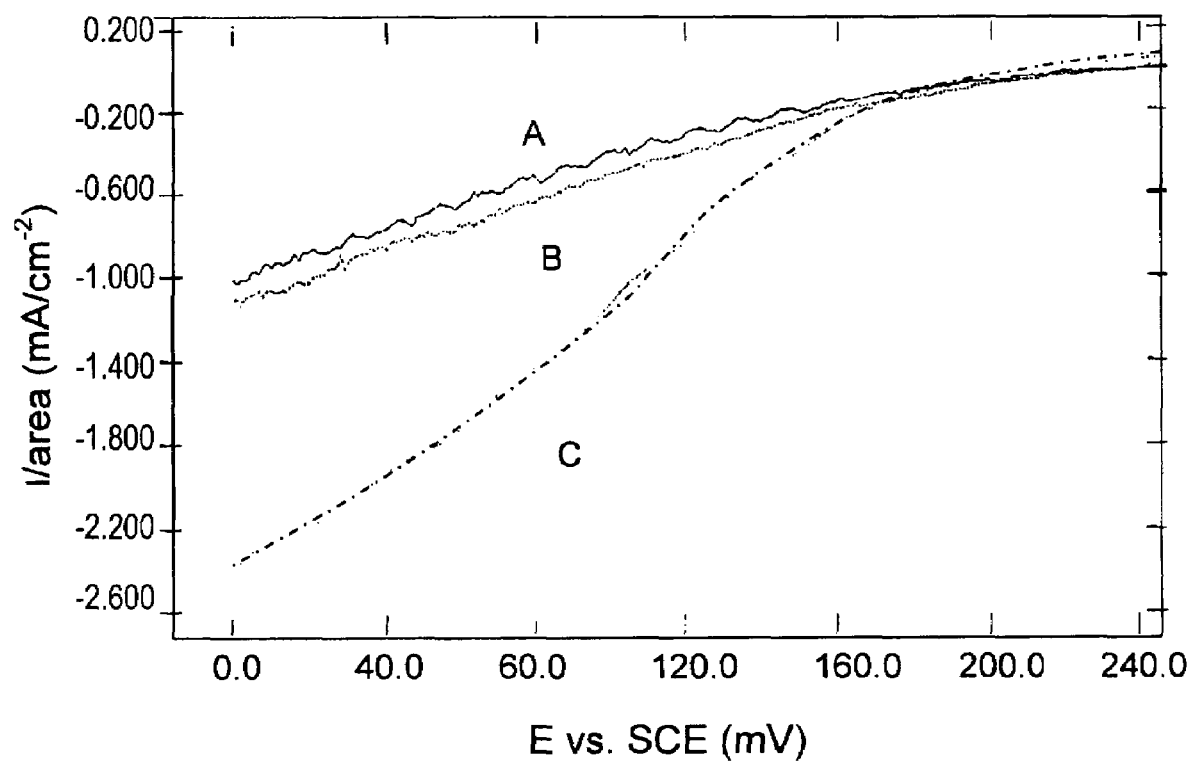
FIG. 8 shows the current/potential curves relating to another embodiment of the invention.

Full-cell experimental set-up: The cathode used in this experiment was the same electrode used in Example 3, supplied by E-TEK (EFCG "S" Type Electrode on TGFH-120 Toray Carbon Paper, 10% Pt/C, 0.5 mg/cm² Pt loading). This electrode was first treated by "electrochemical digging" and then coated with poly(aniline sulfonic acid) and then poly(o-NH₂)TPP, as described in Example 3. The anode, also supplied by E-TEK, was an EFCG electrode: TGPH-120 Toray Carbon Paper, 10% Pt/Ru/C (1:1 a/o), 0.5 mg/cm² Pt/Ru. Part of the electrode was brushed with masking paint so that only 1 cm² was exposed to the electrolytic solution. The two electrodes were introduced in a solution of 1 M H₂SO₄ at 60° C., bubbled continuously with air (100 cc/min) and the cathode and anode reactions were driven by a potentiostat (EG&G, model 273). FIG. 8 shows the current/potential curves obtained (at a scan rate of 1 mV/s) in the presence of 1 and 2% methanol (curves A and B, respectively). The figure also shows the current/potential curve obtained in 1 M H₂SO₄+2% methanol at 60° C. when air is replaced by oxygen (curve C). This figure demonstrates the concept we developed: it is possible to operate a fuel cell without using a membrane separating the cathode from the anode if the cathode is coated with a special thin film which prevents (or reduces) methanol to permeate through the catalytic layer of the cathode. The low currents obtained in this research stage can be increased by using the cathode as a gas diffusion electrode, a property which has not yet been exploited. Moreover, use of anodes with a smaller Pt content will also improve the fuel cell performance, since oxygen reaching the anode is reduced at this electrode and therefore reduces the overall current.

It has been found that in some cases the presence of the methanol barrier film on the cathode permits to omit the presence of the electrolyte membrane in the cell, thus simplifying its construction. This is particularly true in applications employing low current densities, e.g. less than 10 mA/cm².

While examples have been given by way of illustration of embodiments, it will be apparent that the invention is not limited to them, and can be carried into practice with many modifications, variations and adaptations, without departing from its spirit or exceeding the scope of the claims.

The invention claimed is:

1. A cathode for a direct methanol liquid fuel cell with increased protection from methanol poisoning and increased steady oxygen reduction current consisting only of;
   three layers including:
   i) an oxygen-reducing electrocatalyst inner layer;
   ii) directly adjacent to said inner layer an electrically conductive intermediate layer, which is a good proton conductor, of a polymer selected from the group consisting of polyaniline, polypyrrole, and polythiophene, chemically bound or doped sith sulfonate; and
   iii) directly adjacent to the intermediate layer, an outer layer of non-metallated polymerized porphyrin providing a methanol barrier permeable to oxygen.

2. A cathode according to claim 1, wherein the polymerized porphyrin is cross-linked.

* * * * *